Patented Aug. 6, 1940

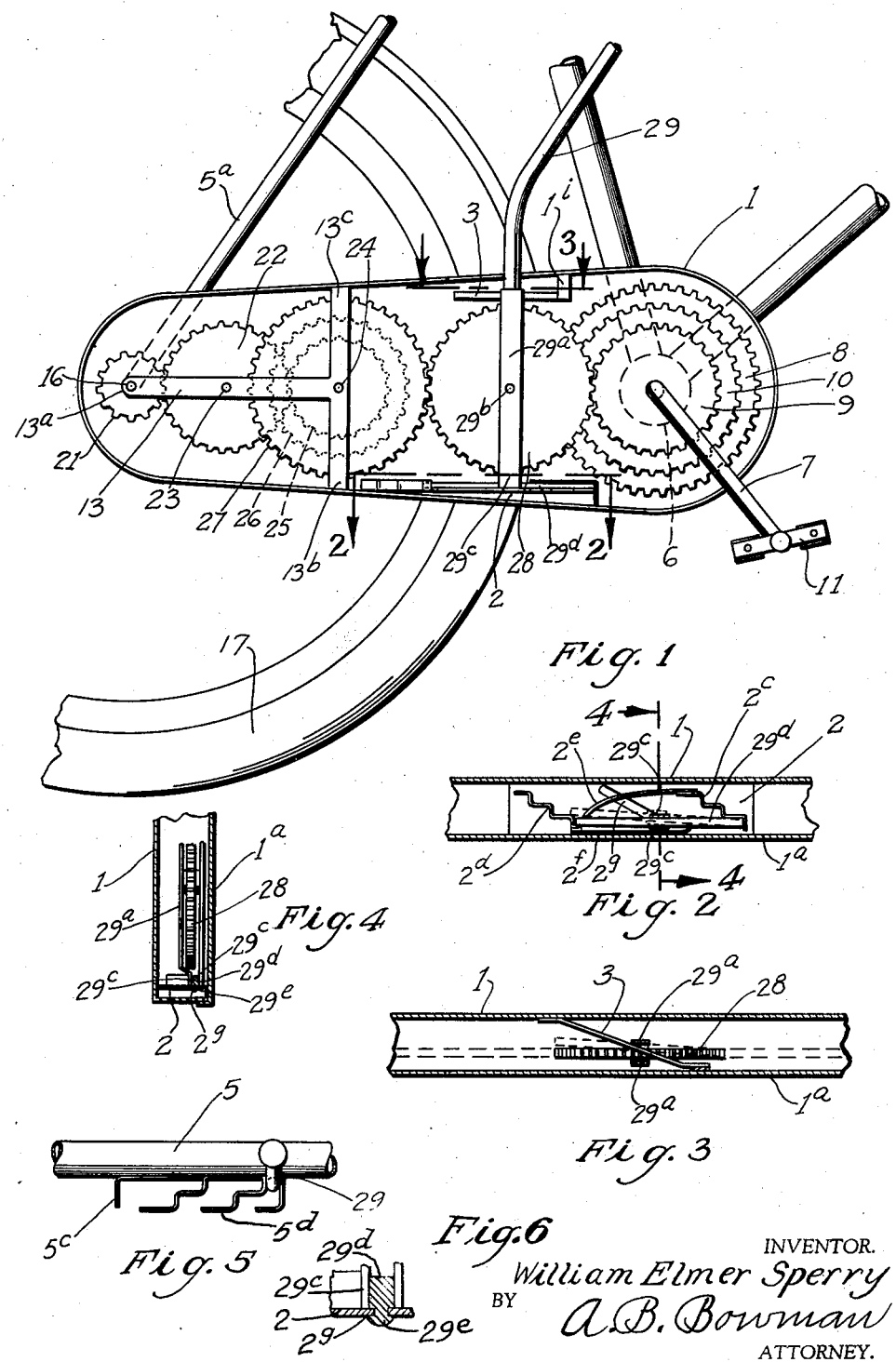

2,210,221

UNITED STATES PATENT OFFICE 2,210,221

BICYCLE TRANSMISSION

William Elmer Sperry, San Diego, Calif.

Application January 28, 1938, Serial No. 187,470

4 Claims. (Cl. 74—342)

My invention relates to improvements in bicycle transmissions and particularly to a means whereby mechanical power may be transmitted from the bicycle crank to the rear or drive wheel of the bicycle, which means gives to the bicycle crank a mechanical advantage over the rear or drive wheel, or vice versa, and which means permits a selection of the ratio of the aforesaid mechanical advantage, and, The principal object of my invention is to provide a bicycle transmission including a gear train positioned between the bicycle crank and the drive or rear wheel and to one side, which is fully enclosed, the casing enclosing said transmission forming a part of the bicycle frame, which provides for a selection of gear ratios, and which has an improved means for shifting or selecting the gear ratios. This invention consists primarily of improvements over my Patent No. 1,938,157, issued in the United States Patent Office December 5, 1933, the particular improvements being in the enclosing of the gear train of said transmission and in the gear shifting means.

With these and other objects in view as will appear hereinafter, my invention consists of certain novel features of construction, combination, and arrangement of parts and portions as will be hereinafter described in detail and particularly set forth in the appended claims reference being had to the accompanying drawing and to the characters of reference thereon which form a part of this application in which:

Figure 1 is a fragmentary elevational view of the bicycle and which shows particularly the bicycle transmission and the casing for said transmission, the cover for said casing being removed; Fig. 2 is a fragmentary sectional view taken along the line 2—2 of Fig. 1; Fig. 3 is a fragmentary sectional view taken along the line 3—3 of Fig. 1; Fig. 4 is a fragmentary sectional view taken along the line 4—4 of Fig. 2; Fig. 5 is a fragmentary top or plan view showing in particular the keeper member for securing the gear shift rod in a given position; and Fig. 6 is an enlarged sectional view of the bar and stud and guide on the same plane as that of Fig. 4.

Similar characters of reference refer to similar parts and portions throughout the several views of the drawing:

The gear casing 1, the gear shift rod guides 2 and 3, bicycle frame 5, bicycle frame crank hanger 6, bicycle crank 7, gears 8, 9, and 10, crank pedal 11, support member 13, rear wheel axle 16, rear or drive wheel 17, rear wheel pinion gear 21, gear 22, shafts 23 and 24, gears 25, 26, and 27, shifting gear 28, and gear shift rod 29 constitute the principal parts and portions of my bicycle transmission.

The bicycle transmission consists of the train of gears 8, 9, 10, 21, 22, 25, 26, 27, and 28, all of which are positioned within the casing 1 between the bicycle crank hanger 6 and the rear wheel axle 16, all as shown best in Fig. 1 of the drawing. The bicycle crank 7 is journalled within the bicycle frame crank hanger 6. This bicycle crank 7 is provided with pedals 11. Secured to the bicycle crank 7 to one side of the crank hanger 6 are the gears 8, 9, and 10. These gears are keyed to this crank 7 to revolve therewith. It will be noted that the gear 8 has the largest diameter and that the gear 9 has the smallest diameter, the gear 10 being intermediate in diameter between gears 8 and 9. Secured to the axle 16 of the rear wheel 17 is the pinion gear 21. This pinion gear 21 is screwed to the axle 16. The axle 16 extends between the ends of the fork 5a of the bicycle frame 5 and supports the wheel 17 thereon. One end of this axle 16 extends between the ends 13a of the support member 13. Positioned over this end of the axle 16 and between the ends 13a of the support member 13 is the pinion 21. Positioned forward from the pinion gear 21 and constantly meshing therewith is the gear 22. This gear 22 is also supported between the pair of support members 13 upon the shaft 23. The gear 22 also meshes with the gear 25 constantly. The gears 25, 26, and 27 are also supported between the support members 13 and are supported upon the shaft 24. The gear 22 is free to turn upon its shaft 23; and the gears 25, 26, and 27, though secured together to turn as a unit, are free to turn upon the shaft 24. The support members 13 are each substantially a T-shape. The ends 13a are secured upon the axle 16, while the ends 13b and 13c are secured to the inside of the casing 1. These two support members 13 are positioned in a spaced apart relation as has hereinbefore been indicated to support the gears 21, 22, 25, 26, and 27, the gears 25, 26, and 27 being as one and supported upon the shaft 24. The gear 28 is rotatably secured between the bifurcated end 29a of the gear shift rod 29 upon the shaft 29b. This gear 28 may turn freely upon this shaft 29b. By being supported between the bifurcated arm 29a of the gear shift rod 29, this gear 28 may be shifted to various positions. In Fig. 1 of the drawing, the gear 28 is shown in mesh with the gear 9 and the gear 27. This gear 28 may be shifted to mesh with the gears 10 and 26, or it may be shifted to mesh with the gears 8 and 25.

The casing 1 is positioned on the right side of the bicycle between the crank hanger 6 and the rear wheel axle 16 as indicated in Fig. 1 of the drawing, and since this casing 1 is of substantial construction and is secured to the bicycle crank hanger 6 and over the right end of the rear axle 16, it may serve in place of one arm of the fork member which normally extends between the hanger 6 and the rear axle 16 on the right hand side of the bicycle.

Between the lower ends 29c of the bifurcated portion 29a of the gear shift rod 29 is secured the bar member 29d by welding or otherwise as indicated best in Figs. 1 and 2 of the drawing. Directly beneath the shiftable gear 28 is positioned the guide 2 as shown best in Figs. 1, 2, and 4 of the drawing. This guide 2 is substantially a partition and is provided with a slot 2g as shown best in Fig. 2 of the drawing, and as indicated in Fig. 4 of the drawing. This slot 2g is positioned as shown in Fig. 2 with respect to the other parts of the transmission and receives the stud 29e which stud 29e is integral with the bar member 29d and positioned midway between its ends, directly beneath the ends 29c of the bifurcated member 29a. The slot 2g serves to guide the gear 28 and the gear shift member 29 in the shifting of gear 28. On the upper surface of the guide 2 is provided a pair of retainer members 2c and 2d. One end of the bar member 29d will engage one of the retainer members, and the other end of this bar will engage the other retainer member. This is indicated best in Fig. 2 of the drawing. These retainer members 2c and 2d are stepped to hold the bar member 29d in any one of three positions. These positions will correspond with the position assumed by the gear 28 when it meshes with the gears 9 and 27, or 10 and 26, or 8 and 25, respectively. A pair of leaf spring members 2e and 2f, as shown in Fig. 2 of the drawing, are provided to help retain the bar member 29d in position. The spring member 2e is secured to the retainer member 2c, and the spring member 2f is secured to the retainer member 2d. In Fig. 2 of the drawing, the bar member 29d is shown in the position with respect to the retainer members 2c and 2d that it will assume when the gear 28 meshes with the gears 9 and 27 as shown in Fig. 1 of the drawing. By broken outline, the bar 29d is shown just about to be shifted to another position.

Extending between the bifurcated arms 29a of the gear shift rod 29 is a guide member 3 as shown in Figs. 1 and 3 of the drawing. This guide member 3 is secured by its one end to the casing 1 and by its other end to an extended portion 1i of the casing 1, thus this guide member 3 is rigidly secured within the casing 1 and serves to guide the gear 28 as the same is shifted.

In Fig. 5 of the drawing a keeper member 5c is shown secured to the portion of the bicycle frame extending between the bicycle seat and the bicycle handle bars. This keeper member 5c is positioned near the bicycle seat and is used to retain the gear shift rod 29 in a fixed position after the gear 28 has been shifted.

The transmission casing 1 is provided with a removable cover 1a. In Fig. 1 of the drawing the cover has been removed.

The operation of my bicycle transmission is as follows:

The gear train disclosed in Fig. 1 of the drawing permits a selection of three gear ratios between the crank 7 and the pinion gear 21. The selection of the gear ratios desired may be made by shifting the gear 28 by means of the gear shift rod 29. This gear 28 and the gear shift rod 29 are guided and pivoted sideways when being shifted by means of the member 3 and by means of the stud 29e in the slot 2g in the guide 2. The gear 28 may be made to mesh with the drive gear 9 and the driven gear 27 as shown in Fig. 1, or it may be made to mesh with the drive gear 10 and the driven gear 26, or it may be made to mesh with the drive gear 8 and the driven gear 25. Once the gear 28 has been brought into engagement with the respective pair of gears desired, this gear 28 will be retained in this engagement by means of the bar member 29d secured between the lower ends 29c of the bifurcated portion 29a of the gear shift member 29, engaging with the retainer member 2c and 2d and also by means of the spring member 2e and 2f. Further this gear 28 will be held in the desired position by means of the keeper member 5c coacting with the gear shift rod 29.

It being noted that taking the gears in the position shown in the drawing that by shifting the upper end of the shift rod 29 outwardly away from the frame, it will pivot on the rod 3 and the lower end will be shifted inwardly toward the bicycle frame and inasmuch as the bar 29d will be held by the step in the member 2c the other end will shift to the dash line position shown in Fig. 2 at the same time the gear 28 will be carried to this angular position. Then by shifting the rod backwardly, the rod, gear and bar 29d are all shifted backwardly so that the end of the bar 29d clears the step and drops into the next step and the gear 28 then meshes with the gears 10 and 26. At the same time the upper end of the rod 29 is in engagement with the step member 5d, it being noted that the stud which is an integral part extended downwardly from the bar 29d is guided in the slot 2g and the member 3 having substantially the same angle from the guides for the side shift as well as the members 5c on the frame 5 shown best in Fig. 5 of the drawing.

Though I have shown and described a particular construction, combination, and arrangement of parts and portions, I do not wish to be limited to this particular construction, combination, and arrangement, but desire to include in the scope of my invention the construction, combination, and arrangement substantially as set forth in the appended claims.

Having thus described my invention, what I claim as new and desire to secure by Letters Patent is:

1. In a bicycle transmission, the combination with a bicycle rear wheel, a pinion gear in connection with said rear wheel, a plurality of gears of different diameter mounted on the bicycle crank shaft to rotate with said crank shaft, of a transmission mechanism including an auxiliary gear supporting and enclosing casing, a train of gears operably mounted within said casing including a group of different diameter gears on a shaft in said casing in spaced aligned relation to the gears on said crank shaft, a gear shiftably mounted within said casing, said gear selectively engageable with said group of different diameter gears mounted in said casing and with said plurality of gears mounted on the bicycle crank shaft whereby a plurality of driving ratios is provided, a gear shift member carrying said shiftable gear and a guide member in engagement with said gear shift member, and retainer means in connection with and beneath said gear shift member to retain the shiftable gear in engagement with one of said group of gears and with one of said plurality of gears mounted on the bicycle crank shaft.

2. In a bicycle transmission, the combination with a bicycle rear wheel, a pinion gear in connection with said rear wheel, a plurality of gears of different diameters mounted on the bicycle crank shaft to rotate with said crank shaft, of a transmission mechanism including an auxiliary gear supporting and enclosing casing, a train of gears operably mounted within said casing including a group of different diameter gears on a shaft in said casing in spaced aligned relation to the gears on said crank shaft, a gear shiftably mounted within said casing, said gear selectively engageable with said group of different diameter gears mounted in said casing and with said plurality of gears mounted on the bicycle crank shaft whereby a plurality of driving ratios is provided, a gear shift member carrying said shiftable gear, the gear shift member being provided with a stud, which stud engages and moves within a slot in a partition positioned beneath said shiftable gear.

3. In a bicycle transmission, the combination with a bicycle rear wheel, a pinion gear in connection with said rear wheel, a plurality of gears of different diameters mounted on the bicycle crank shaft to rotate with said crank shaft, of a transmission mechanism including an auxiliary gear supporting and enclosing casing, a train of gears operably mounted within said casing including a group of different diameter gears on a shaft in said casing in spaced aligned relation to the gears on said crank shaft, a gear shiftably mounted within said casing, said gear selectively engageable with said group of different diameter gears mounted in said casing and with said plurality of gears mounted on the bicycle crank shaft whereby a plurality of driving ratios is provided, a gear shift member carrying said shiftable gear, the gear shift member being provided with a stud, which stud engages and moves within a slot in a partition positioned beneath said shiftable gear, a bar member secured to said gear shift member at its lower end, retainer means coacting with said bar member to retain said gear shift member and said shiftable gear in a fixed position.

4. In a bicycle transmission, the combination with a bicycle rear wheel, a pinion gear in connection with said rear wheel, a plurality of gears of different diameters mounted on the bicycle crank shaft to rotate with said crank shaft, of a transmission mechanism including an auxiliary gear supporting and enclosing casing, a train of gears operably mounted within said casing including a group of different diameter gears on a shaft in said casing in spaced aligned relation to the gears on said crank shaft, a gear shiftably mounted within said casing, said gear selectively engageable with said group of different diameter gears mounted in said casing and with said plurality of gears mounted on the bicycle crank shaft whereby a plurality of driving ratios is provided, a gear shift member carrying said shiftable gear, the gear shift member being provided with a stud, which stud engages and moves within a slot in a partition positioned beneath said shiftable gear, a bar member secured to said gear shift member at its lower end, retainer means coacting with said bar member to retain said gear shift member and said shiftable gear in a fixed position, said spring members secured to coact with said bar members.

WILLIAM ELMER SPERRY.